(12) United States Patent  
Huang et al.

(10) Patent No.: US 11,375,000 B1  
(45) Date of Patent: Jun. 28, 2022

(54) DATA TRANSMISSION METHOD AND DEVICE OF SERVER FIRMWARE VIA HTTP/HTTPS

(71) Applicant: GIGA-BYTE TECHNOLOGY CO., LTD., New Taipei (TW)

(72) Inventors: Kai Chin Huang, New Taipei (TW); Heng Ping Hsu, New Taipei (TW); Tai Li Lin, New Taipei (TW)

(73) Assignee: GIGA-BYTE TECHNOLOGY CO., LTD., New Taipei (TW)

(*) Notice: Subject to any disclaimer, the term of this patent is extended or adjusted under 35 U.S.C. 154(b) by 0 days.

(21) Appl. No.: 17/199,107

(22) Filed: Mar. 11, 2021

(30) Foreign Application Priority Data

Dec. 30, 2020 (TW) ................................. 109146761

(51) Int. Cl.
*G06F 9/455* (2018.01)
*H04L 67/02* (2022.01)
*H04L 67/60* (2022.01)
*H04L 67/06* (2022.01)

(52) U.S. Cl.
CPC .............. *H04L 67/02* (2013.01); *H04L 67/06* (2013.01); *H04L 67/32* (2013.01)

(58) Field of Classification Search
CPC .......... G06F 12/084; G06F 8/65; G06F 8/654; H04L 67/34; H04L 12/40182; H04L 67/06; H04L 67/32; H04L 67/02
See application file for complete search history.

(56) References Cited

U.S. PATENT DOCUMENTS

| 9,015,694 B2 | 4/2015 | Gray et al. |
| 9,766,880 B2 | 9/2017 | Lo |
| 10,409,584 B1 | 9/2019 | Kulchytskyy et al. |
| 2009/0282399 A1 | 11/2009 | Kamrowski |
| 2016/0378576 A1 | 12/2016 | Jayakumar et al. |
| 2018/0150391 A1* | 5/2018 | Mitchel ................... H04L 41/12 |

(Continued)

FOREIGN PATENT DOCUMENTS

TW I598816 B 9/2017

OTHER PUBLICATIONS

European Search Report dated Sep. 28, 2021 as received in application No. 21166264.8.

(Continued)

*Primary Examiner* — Chirag R Patel

(74) *Attorney, Agent, or Firm* — Maschoff Brennan

(57) ABSTRACT

Data transmission method of server firmware adapted to a server having request end firmware devise, server end firmware devise and shared memory, with the method comprises: putting a request into the shared memory via http/https by the request end firmware devise, obtaining the request from the shared memory by the server end firmware devise from the shared memory, storing a requested data file and a completion notification into the shared memory via http/https according to the request by the server end firmware devise when the request is determined as conforming to a request rule by the server end firmware devise, wherein the completion notification is marked as success when the request content is accord with a request rule, and obtaining the requested data file from the shared memory when the completion notification is received and determined as success by the request end firmware devise.

10 Claims, 2 Drawing Sheets

(56) References Cited

U.S. PATENT DOCUMENTS

2020/0012501 A1\* 1/2020 Suryanarayana ....... G06F 21/44
2020/0137084 A1 4/2020 Roy et al.
2020/0356357 A1\* 11/2020 Narasimhan ............ G06F 9/455
2021/0011735 A1\* 1/2021 Edwards, III ........... G06F 9/445

OTHER PUBLICATIONS

TW Office Action dated Oct. 29, 2021 as received in Application No. 109146761.

\* cited by examiner

DATA TRANSMISSION METHOD AND DEVICE OF SERVER FIRMWARE VIA HTTP/HTTPS

CROSS-REFERENCE TO RELATED APPLICATIONS

This non-provisional application claims priority under 35 U.S.C. § 119(a) on Patent Application No(s). 109146761 filed in Taiwan, R.O.C. on Dec. 30, 2020, the entire contents of which are hereby incorporated by reference.

BACKGROUND

1. Technical Field

This disclosure relates to a data transmission method of server firmware and a data transmission device of server firmware. More particularly, the disclosure relates to a data transmission method of server firmware and a data transmission device of server firmware via HTTP/HTTPS.

2. Related Art

In the application of a server, a data transmission method between a basic input/output system (BIOS) and a baseboard management controller (BMC) of the server may be implemented via a virtual universal serial bus local area network (virtual USB LAN), thereby performing data exchange by simulating the operation of networking. For example, an event request, a request content, a request information related to the request content or the like may be transmitted in a form of packet in the virtual USB LAN mentioned above by following the hypertext transfer protocol (HTTP) or hypertext transfer protocol secure (HTTPS).

However, such data transfer method requires driver installation between firmware, which leads to prolonged starting time of the firmware. In addition, since a delay may be easily generated in the data transmission in the form of a packet when the size of data is large, the delay may result in access timeout, disconnection or the like, thereby interrupting the process of data transmission. Briefly speaking, a more complete data transmission method in the related field about data transmission of server is needed.

SUMMARY

According to one or more embodiment of this disclosure, a data transmission method of server firmware adapted to a server having a request end firmware device, a server end firmware device and a shared memory, the method comprises: storing a request content into the shared memory via hypertext transfer protocol/hypertext transfer protocol secure (HTTP/HTTPS) by the request end firmware device; obtaining the request content by the server end firmware device from the shared memory; determining whether the request content is accord with a request rule by the server end firmware device; storing a request information and a complete notification into the shared memory via HTTP/HTTPS according to the request content by the server end firmware device when the request content is accord with the request rule, wherein the complete notification is marked as success when the request content is accord with a request rule; receiving the complete notification and determining whether the complete notification is success by the request end firmware device; and obtaining the request information from the shared memory when the complete notification is determined as success by the request end firmware device.

According to one or more embodiment of this disclosure, a data transmission device of server firmware comprises: a shared memory configured to connect between a request end firmware device and a server end firmware device, and the shared memory storing a request content from the request end firmware device or storing a complete notification from the server end firmware device, wherein the shared memory supports data transmission via HTTP/HTTPS between the two firmware devices.

In view of the above description, the data transmission method of server firmware of the present disclosure utilizes the shared memory disposed between the request end firmware device and the server end firmware device of the server, and the event request, the request content, the request information and lastly the complete notification are being transmitted and accessed between the request end firmware device and the server end firmware device via HTTP/HTTPS through the shared memory. Therefore, by implementing the data transmission method of server firmware of the present disclosure, driver installation between firmware is not required and such may reduce the starting time of firmware, and to request end firmware device, it is still operated in the same HTTP/HTTPS protocol. Besides, since data transmission is via the access of the shared memory, the time cost when transmitting data in the server may be massively reduced, and the situation of transmission failure caused by access timeout may be excluded.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

The present disclose mainly utilizes a shared memory which may be commonly accessed by two firmware of a server and operates data transmission following the hypertext transfer protocol/hypertext transfer protocol secure (HTTP/HTTPS). The present disclose not only maintains the commonality of firmware communication with HTTP/HTTPS standard of modern server technique field, but also reduces the time of data transmission and raises the transmission efficiency, comparing to the virtual LAN transmission method of related art, by directly accessing the shared memory.

Figure 1:
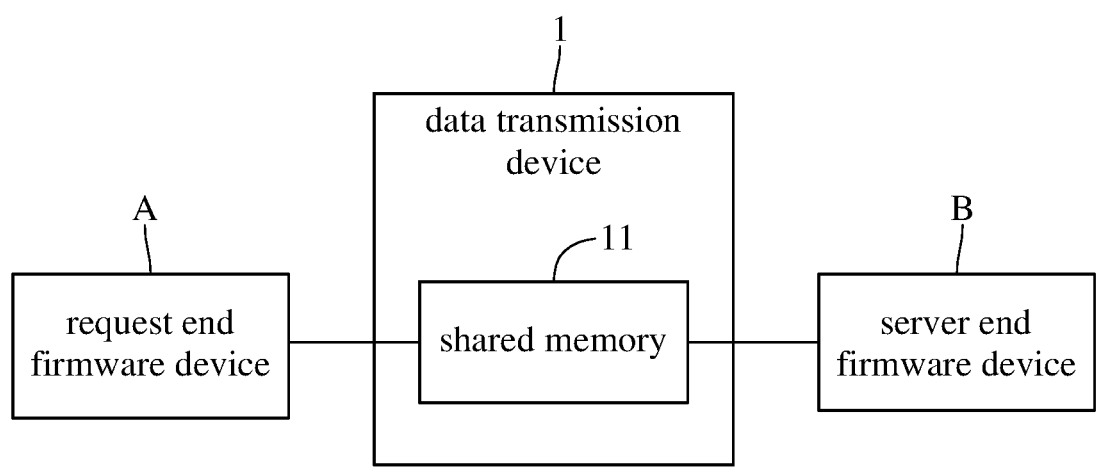
FIG. 1 is a block diagram of the data transmission device of server firmware according to an embodiment of the present disclosure.

Please refer to FIG. 1 which is a block diagram of the data transmission device of server firmware according to the embodiment of the present disclosure. The data transmission device 1 of server firmware may comprise a shared memory 11, and such shared memory 11 may be configured to connect a request end firmware device A and a server end firmware device B, and support the data transmission operated via HTTP/HTTPS between the two firmware devices A and B, for example, the shared memory 11 may store an event request and a request content from the request end firmware device A, or store a request information and a complete notification from the server end firmware device B. In an embodiment of the present disclosure, the request end firmware device A may be a basic input/output system (BIOS), and the server end firmware device B may be an embedded processing unit, more particularly a baseboard management controller (BMC).

Compared to the conventional server which has to transmit the event request and the above-mentioned request content via a transmission channel (e.g., a network cable) between the request end firmware device A and the server end firmware device B. The data transmission device of server firmware of the present disclosure does not include the transmission channel mentioned above, and instead transmits the event request and the request content from the request end firmware device A to the server end firmware device B, or transmits the request information and the complete notification in the last of the data transmission from the server end firmware device B to the request end firmware device A via the shared memory 11. The event request may be a regular notification from the request end to the server end under the HTTP/HTTPS standard, e.g., a request for a certain data, wherein the event request may also have a location information of the request end. And the request content may be a location of the certain data and its access method. Particularly, the server end firmware device B normally detects whether an event request and a request content from the request end firmware device A are stored into the shared memory 11. After storing the event request and the request content, the request end firmware device A also continuously detects whether a complete notification and a request information from the server end firmware device B are stored into the shared memory 11. Accordingly, the data transmission method performing the access of the request content and the request information via the shared memory 11 may effectively reduce the time of data transmission and the occurrence of timeout and disconnection. Generally speaking, in the standard utilizing HTTP/HTTPS, the request content may be implement by a universal resource locator (URL) and stores a data address in a form of a URL site, and the request information may be the certain data stored in an address related to the URL site. Hereinbelow, said data transmission method is thoroughly described with the flowchart.

Figure 2:
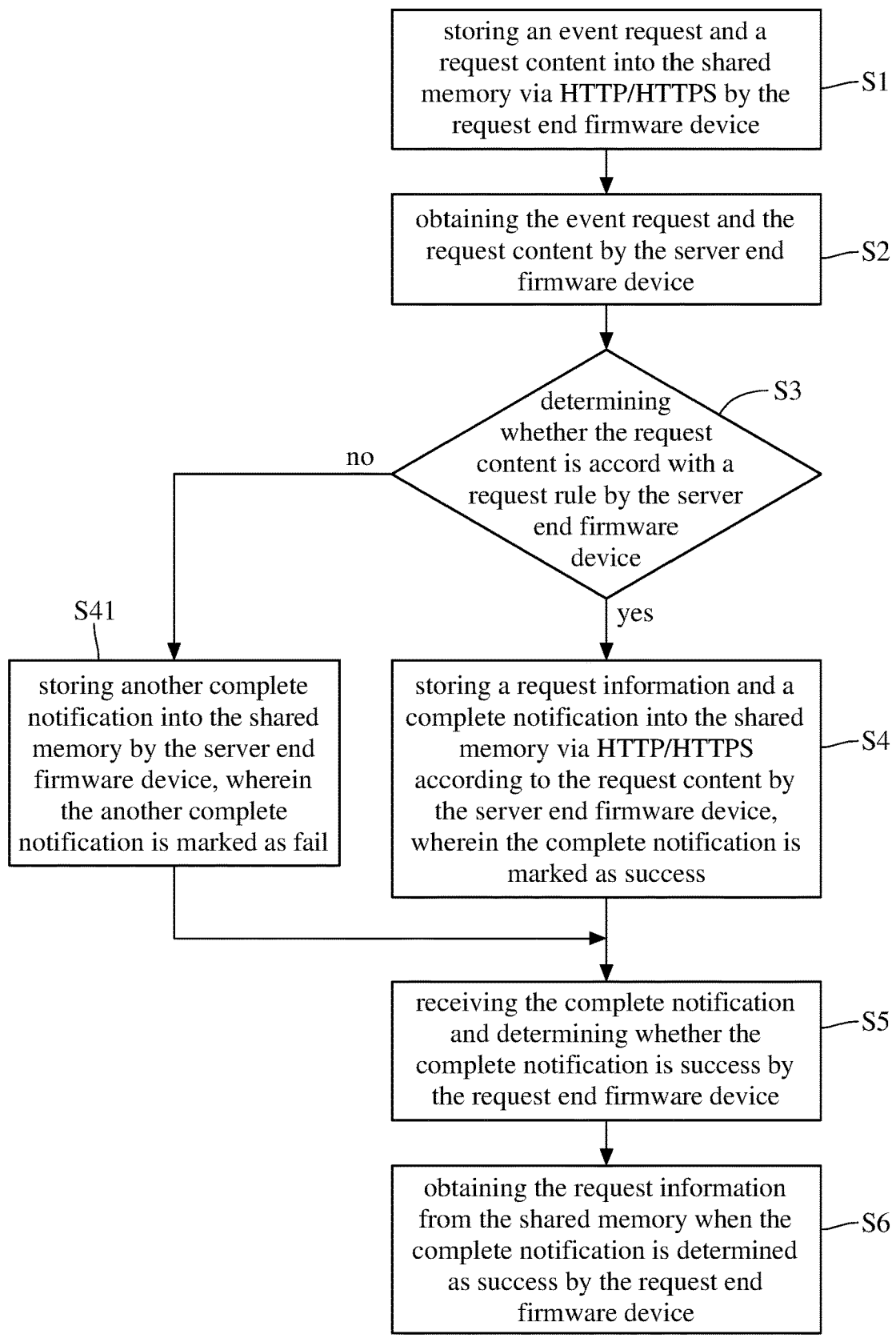
FIG. 2 is a flowchart of the data transmission method of server firmware according to an embodiment of the present disclosure.

Please refer to FIG. 2 which is a flowchart of the data transmission method of server firmware according to the embodiment of the present disclosure, wherein said method comprises: step S1, storing an event request and a request content into the shared memory 11 via HTTP/HTTPS by the request end firmware device A. Step S2, obtaining the event request and the request content by the server end firmware device B. Step S3, determining whether the request content is accord with a request rule by the server end firmware device B. When the request content is accord with the request rule, continue to step S4, storing a request information and a complete notification into the shared memory 11 via HTTP/HTTPS according to the request content by the server end firmware device A, wherein the complete notification is marked as success. On the contrary, when the request content is not accord with the request rule, continue to step S41, storing another complete notification into the shared memory 11 by the server end firmware device B, wherein the another complete notification is marked as fail. Step S5, receiving the complete notification and determining whether the complete notification is success by the request end firmware device A. Lastly, step S6, obtaining the request information from the shared memory 11 when the complete notification is determined as success by the request end firmware device A, is performed.

In step S1, since the event request is still transmitted via HTTP/HTTPS to the request end firmware device A, the first process of data transmission is still outputting a URL site related to a data, and it similarly follows the HTTP/HTTPS standard of industry without the requirement of additional driver installed to the shared memory 11. In an embodiment of the present disclosure, the request end firmware device A may transmit the event request and the request content to the server end firmware device B through the shared memory 11. In step S2, since the server end firmware device B normally detects the contents in the shared memory 11, once the event request and the request content from the request end firmware device A is detected, the server end firmware device B may obtain the event request and the request content through the shared memory 11.

The request rule in step S3 is not limited by the present disclosure. The request rule may be: determining whether the request content (e.g., a URL site) has any related request information (e.g., the URL site (data site) may correspond to a file), or determining whether the request information related to the request content is exactly the request information related to the event request (the opposite example is: a file D1 is requested, but the file related to the site is another file D2), or determining whether an event request and a request content form the same request end firmware device (e.g., the request end firmware device A) exist in the shared memory 11 (e.g., may determine whether the event request exists in the shared memory 11, and determine whether the event request is transmitted from the request end firmware device A), or the like. More specifically, when the request rule comprises the three conditions above, the situation below may be regarded as being accord with the request rule. That is, the request content is related to a request information, and the request information is exactly the request information related to the event request, and the event request and the request content from the same request end firmware device (e.g., the request end firmware device A) exist in the shared memory 11. A situation where the request content is not related to any request information, or the request information is not exactly the request information related to the event request, or the event request and the request content from the same request end firmware device do not exist in the shared memory 11 (e.g., both the event request and the request content from the request end firmware device A cannot be found in the shared memory 11) may be regarded as not being accord with the request rule. However, the present disclosure does not limit the contents of the request rule, which may be at least one of the three conditions above or may comprise other condition set depending on needs. In addition, another condition of determination of the request content not related to any request information may be: repeatedly searching and determining whether there is not any request information related to the request content. Further, the another situation may be regarded as "this request content is not related to any request information" when a number of times of "not-related" counted by a counter of the server is over a predetermined number of times.

In step S4, since the request content is accord with the request rule, the complete notification marked as success and the request information related to the request content may be stored into the shared memory 11, and the request end firmware device A, which continues detecting the contents in the shared memory 11 after storing the event request and the request content, may obtain the complete notification marked as success. And in steps S5 and S6, the request end firmware device A may obtain the request information from the shared memory 11 when determining that the complete notification is success.

In step S41, since the request content is not accord with the request rule, the complete notification marked as fail may be stored into the shared memory 11 while no request information stored into the shared memory 11. At that time, the request end firmware device A may obtain the complete notification marked as fail from the shared memory 11. And since the complete notification is determined as fail in step S5, the continuation to the process of obtaining the request information of step S6 is not executed.

The largest difference between the data transmission method of server firmware of the present disclosure and the related art is that the data transmission method of server firmware of the present disclosure does not adopt the transmission channels, such as a physics network cable or a virtual network cable, utilized in the conventional techniques, and instead utilizes the shared memory to perform data transmission in the server under the standard of HTTP/HTTPS. Since the shared memory is usually used in relation with physical device rather than in data transmission of the field of server, the present disclosure is not easily anticipated by a person skill in the art.

In view of the above description, the data transmission method of server firmware of the present disclosure utilizes the shared memory disposed between the request end firmware device and the server end firmware device of the server, and the event request, the request content, the request information and lastly the complete notification are being transmitted and accessed between the request end firmware device and the server end firmware device via HTTP/HTTPS through the shared memory. Therefore, by implementing the data transmission method of server firmware of the present disclosure, driver installation between firmware is not required and such may reduce the starting time of firmware. Further, the request end firmware device is still operated in the same HTTP/HTTPS protocol. Besides, since data transmission is performed via the access of the shared memory, the time cost when transmitting data in the server may be massively reduced, and the situation of transmission failure caused by access timeout may be excluded.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A data transmission method of server firmware, adapted to a server having a request end firmware device, a server end firmware device and a shared memory, the method comprising:
    storing a request content into the shared memory via hypertext transfer protocol/hypertext transfer protocol secure (HTTP/HTTPS) by the request end firmware device;
    obtaining the request content by the server end firmware device from the shared memory;
    determining whether the request content is accord with a request rule by the server end firmware device;
    storing a request information and a complete notification into the shared memory via HTTP/HTTPS according to the request content by the server end firmware device when the request content is accord with the request rule, wherein the complete notification is marked as success when the request content is accord with a request rule;
    receiving the complete notification and determining whether the complete notification is success by the request end firmware device; and
    obtaining the request information from the shared memory when the complete notification is determined as success by the request end firmware device.

2. The data transmission method of server firmware of claim 1, wherein determining whether the request content is accord with the request rule by the server end firmware device comprises:
    determining whether the request content contains any related request information.

3. The data transmission method of server firmware of claim 2, further comprising:
    storing an event request into the shared memory via HTTP/HTTPS by the request end firmware device;
    obtaining the event request from the shared memory by the server end firmware device,
    wherein determining whether the request content is accord with the request rule by the server end firmware device further comprises: determining whether the shared memory stores the event request, and determining whether the event request is transmitted from the request end firmware device.

4. The data transmission method of server firmware of claim 3, wherein determining whether the request content is accord with the request rule by the server end firmware device further comprises:
    determining whether the request information related to the request content is exactly the request information related to the event request.

5. The data transmission method of server firmware of claim 2, further comprising:
    storing an event request into the shared memory via HTTP/HTTPS by the request end firmware device; and
    obtaining the event request from the shared memory by the server end firmware device,
    wherein determining whether the request content is accord with the request rule by the server end firmware device further comprises: determining whether the request information related to the request content is exactly the request information related to the event request.

6. The data transmission method of server firmware of claim 1, further comprising: storing another complete notification into the shared memory by the server end firmware device when the request content is not accord with the request rule, wherein the another complete notification is marked as fail when the request content is not accord with the request rule.

7. The data transmission method of server firmware of claim 1, wherein the request end firmware device is a basic input/output system.

8. The data transmission method of server firmware of claim 1, wherein the server end firmware device is an embedded processing unit.

9. The data transmission method of server firmware of claim 8, wherein the embedded processing unit is a baseboard management controller.

10. A server, comprising:
a shared memory;
a request end firmware device connected to the shared memory, the request end firmware device configured to store a request content into the shared memory via hypertext transfer protocol/hypertext transfer protocol secure (HTTP/HTTPS); and
a server end firmware device connected to the shared memory, the server end firmware device configured to obtain the request content from the shared memory, determine whether the request content is accord with a request rule, and store request information and a complete notification into the shared memory via HTTP/HTTPS according to the request content when the request content is accord with the request rule,
wherein the request end firmware device further receives the complete notification and determines whether the complete notification is marked as successful, and the shared memory obtains the request information when the complete notification is marked as successful.

\* \* \* \* \*